United States Patent
Hovasapyan et al.

(10) Patent No.: US 10,899,348 B2
(45) Date of Patent: Jan. 26, 2021

(54) METHOD, APPARATUS AND COMPUTER PROGRAM PRODUCT FOR ASSOCIATING MAP OBJECTS WITH ROAD LINKS

(71) Applicant: HERE GLOBAL B.V., Eindhoven (NL)

(72) Inventors: Sargis Hovasapyan, Berlin (DE); Leonid Ziskel, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 373 days.

(21) Appl. No.: 15/848,453

(22) Filed: Dec. 20, 2017

(65) Prior Publication Data
US 2019/0184986 A1 Jun. 20, 2019

(51) Int. Cl.
| | |
|---|---|
| *G01C 22/00* | (2006.01) |
| *G05D 1/00* | (2006.01) |
| *B60W 30/095* | (2012.01) |
| *B60W 40/02* | (2006.01) |
| *G06K 9/00* | (2006.01) |

(Continued)

(52) U.S. Cl.
CPC ........ *B60W 30/0956* (2013.01); *B60W 30/10* (2013.01); *B60W 40/02* (2013.01); *G01C 21/3679* (2013.01); *G06K 9/00798* (2013.01); *G06K 9/00805* (2013.01);
(Continued)

(58) Field of Classification Search
CPC .. B60W 30/0956; B60W 40/02; B60W 30/10; B60W 2550/14; B60W 2550/10; G01C 21/3679; G06K 9/00798; G06K 9/00805; G08G 1/167; G05D 1/0088
See application file for complete search history.

(56) References Cited

U.S. PATENT DOCUMENTS

| | | | |
|---|---|---|---|
| 7,251,561 B2 | 7/2007 | Dotan et al. | |
| 10,324,463 B1* | 6/2019 | Konrardy | ............ B60W 50/082 |

(Continued)

FOREIGN PATENT DOCUMENTS

| | | |
|---|---|---|
| EP | 1111338 A2 | 6/2001 |
| EP | 2 213 983 A2 | 8/2010 |

(Continued)

OTHER PUBLICATIONS

Extended European Search Report for Application No. EP 18211724.2 dated May 20, 2019, 10 pages.

*Primary Examiner* — Harry Y Oh
(74) *Attorney, Agent, or Firm* — Alston & Bird LLP

(57) ABSTRACT

Embodiments described herein may provide a method for identifying objects along a path established though the Electronic Horizon. An apparatus is provided to facilitate autonomous or semi-autonomous control of a vehicle, where the apparatus is caused to: determine, within a road network, a sequence of road links that satisfy a predetermined likelihood of being traversed by a vehicle, where the road network is segmented into tiles in a map data service provider database; receive, in response to determining the sequence of road links, one or more tiles corresponding to the sequence of road links; search within the one or more tiles for objects within a predetermined distance of the sequence of road links; and generate an object profile for each object, where the object profile includes information relating to the respective object and a distance of the respective object from the road link.

18 Claims, 8 Drawing Sheets

A

B

(51) Int. Cl.
  *B60W 30/10* (2006.01)
  *G08G 1/16* (2006.01)
  *G01C 21/36* (2006.01)

(52) U.S. Cl.
  CPC ......... *G08G 1/167* (2013.01); *B60W 2552/00* (2020.02); *B60W 2554/00* (2020.02); *G05D 1/0088* (2013.01)

(56) References Cited

U.S. PATENT DOCUMENTS

| | | | |
|---|---|---|---|
| 2011/0238690 A1* | 9/2011 | Arrasvuori | G06F 3/04812 |
| | | | 707/769 |
| 2013/0166586 A1 | 6/2013 | Pfeifle et al. | |
| 2013/0325319 A1* | 12/2013 | Moore | G01C 21/36 |
| | | | 701/412 |
| 2015/0197246 A1 | 7/2015 | Nagasaka et al. | |
| 2016/0132513 A1* | 5/2016 | Lim | H04W 4/60 |
| | | | 707/724 |
| 2016/0178383 A1 | 6/2016 | Mays et al. | |
| 2017/0248963 A1* | 8/2017 | Levinson | G01C 21/32 |
| 2018/0010920 A1* | 1/2018 | Poppen | G01C 21/3476 |
| 2019/0174063 A1* | 6/2019 | Huang | B64D 47/08 |

FOREIGN PATENT DOCUMENTS

| | | |
|---|---|---|
| EP | 3 048 422 A1 | 7/2016 |
| EP | 3 078 937 A1 | 10/2016 |
| WO | WO 2009/121299 A1 | 10/2009 |
| WO | WO-2016/113130 A2 | 7/2016 |
| WO | WO-2017/005796 A1 | 1/2017 |

\* cited by examiner

METHOD, APPARATUS AND COMPUTER PROGRAM PRODUCT FOR ASSOCIATING MAP OBJECTS WITH ROAD LINKS

TECHNOLOGICAL FIELD

An example embodiment of the present invention relates generally to associating map objects with road links, and more particularly, to a method, apparatus and computer program product for identifying objects proximate road links along a path likely to be traversed by a vehicle and generating object profiles for each object.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route, or general assistance to a user when no specific destination has been selected. Further, dynamic map attributes such as route traffic, route conditions, and other dynamic map-related information may be provided to enhance the digital maps and facilitate navigation and driver assistance through situational awareness. Typical digital maps and navigation systems may have copious amounts of information available, from various road network awareness to accident, construction, and other traffic-related dynamically updated data. This data is often unused unless a destination has been selected and route guidance to the destination planned. Further, the ubiquity of available data results in a copious amount of data and information pertaining to objects that may be found within an area represented by a map. The volume of associated data may be overwhelming for mapping software or navigation systems.

BRIEF SUMMARY

A method, apparatus, and computer program product are therefore provided for generating object profiles for objects identified along road links corresponding to a path of a vehicle. An apparatus is provided to facilitate autonomous or semi-autonomous control of a vehicle. The apparatus may include at least one processor and at least one non-transitory memory including computer program code instructions. The computer program code instructions configured to, when executed, cause the apparatus to: determine, within a road network, a sequence of road links that satisfy a predetermined likelihood of being traversed by a vehicle, where the road network is segmented into tiles in a map data service provider database; receive, in response to determining the sequence of road links, one or more tiles corresponding to the sequence of road links; search within the one or more tiles for objects within a predetermined distance of the sequence of road links; generate an object profile for each object, where the object profile includes information relating to the respective object and a distance of the respective object from the road link; and provide for at least semi-autonomous control of the vehicle based, at least in part, on the object profiles for objects associated with road links traversed by the vehicle. Causing the apparatus to search within the one or more tiles may include causing the apparatus to search for objects meeting at least one predefined criteria in addition to being within a predetermined distance of a road link of the sequence of road links.

Embodiments described herein may provide an apparatus including at least one processor and at least one non-transitory memory including computer program code instructions. The computer program code instructions configured to, when executed, cause the apparatus to: determine, within a road network, a sequence of road links that satisfy a predetermined likelihood of being traversed by a vehicle; identify objects that are within a predefined distance of each road link of the sequence of road links; generate an object profile for each object, where the object profile includes information relating to the respective object and a distance of the respective object from the road link; and generate driver assistance instructions based on the sequence of road links and the object profiles for each object within a predefined distance of each of the road links of the sequence of road links. Causing the apparatus to determine, within a road network, a sequence of road links that satisfy a predetermined likelihood of being traversed by a vehicle may include causing the apparatus to: identify road links within the road network that satisfy a predetermined likelihood of being traversed by the vehicle, where the road network is sub-divided into a plurality of map tiles; and provide for retrieval of each map tile from among the plurality of map tiles that includes at least one identified road link.

According to some embodiments, causing the apparatus to identify objects that are within a predefined distance of each of the sequence of road links may include causing the apparatus to: search within the retrieved tiles for objects; and identify objects within the retrieved tiles in response to the search that correspond to at least one predefined object type and within the predefined distance of each of the sequence of road links. Causing the apparatus to identify objects within the predefined distance of each of the sequence of road links may include causing the apparatus to: identify a first road link from the sequence of road links; determine an object type; determine the predefined distance based on the object type; search for objects of the object type within the predefined distance of the first road link, where the predefined distance is a distance perpendicular to a polyline defined by the road link; and identify objects of the object type within the predefined distance of the first road link.

According to some embodiments, the object profile for each object may include: a description of the object relative to the associated road link; an object type; an offset of the object from a predefined point on a path including the associated road link; and a geometry of the object, where the geometry of the object may include at least a longitude and latitude position for at least one edge of the object. Causing the apparatus to identify objects that are within a predefined distance of each of the sequence of road links may include causing the apparatus to, in response to an object extending beyond the predefined distance of the road link cut off the object at the predefined distance from the road link. Causing the apparatus to generate an object profile for each object may include causing the apparatus to identify each object as one of static or dynamic, where static objects remain stationary relative to the road link and dynamic objects move relative to the road link.

The predefined distance from each road link within which objects are identified may be dependent upon at least one of a number of lanes of the respective road segment or a functional class of the respective road segment. The driver assistance instructions may include one or more of: location referencing, lane assistance, adaptive cruise control, or emergency braking.

Embodiments may provide a computer program product including at least one non-transitory computer-readable storage medium having computer-executable program code instructions stored therein. The computer-executable program code instructions may include program code instructions to: determine, within a road network, a sequence of road links that satisfy a predetermined likelihood of being traversed by a vehicle; identify objects that are within a predefined distance of each of the sequence of road links; generate an object profile for each object, where the object profile includes information relating to the respective object and a distance of the respective object from the road link; and generate driver assistance instructions based on the sequence of road links and the object profiles for each object within a predefined distance of each of the sequence of road links. The program code instructions to determine, within the road network, the sequence of road links that satisfy a predetermined likelihood of being traversed by a vehicle may include program code instructions to: identify road links within the road network that satisfy a predetermined likelihood of being traversed by the vehicle, where the road network is sub-divided into a plurality of map tiles; and provide for retrieval of each map tile from among the plurality of map tiles that includes at least one identified road link.

According to some embodiments, the program code instructions to identify objects that are within a predefined distance of each of the sequence of road links may include program code instructions to: search within the retrieved tiles for objects; and identify objects within the retrieved tiles in response to the search that correspond to at least one predefined object type and within the predefined distance of each of the sequence of road links. The program code instructions to identify objects within a predefined distance of each of the sequence of road links may include program code instructions to: identify a first road link from the sequence of road links; determine an object type; determine the predefined distance based on the object type; search for objects of the object type within the predefined distance of the first road link where the predefined distance is a distance perpendicular to a polyline defined by the road link; and identify objects of the object type within the predefined distance of the first road link.

The object profile for each object may include: a description of the object relative to the associated road link; an object type; an offset of the object from a defined point on a path including the associated road link; and a geometry of the object, where the geometry of the object includes at least a latitude and longitude position for at least one edge of the object. The program code instructions to identify objects that are within a predefined distance of each of the sequence of road links may include program code instructions to, in response to an object extending beyond the predefined distance of the road link, cut off the object at the predefined distance from the road link. The program code instructions to generate an object profile for each object may include program code instructions to identify each object as one of static or dynamic, where static objects remain stationary relative to the road link, and dynamic objects move relative to the road link.

According to some embodiments, the predefined distance may be determined for each road link, and the predefined distance of a respective road link is dependent upon one or more of a number of lanes of the respective road segment or a functional class of the respective road segment. The driver assistance instructions may include one or more of: location referencing, lane assistance, adaptive cruise control, or emergency braking.

Embodiments provided herein may provide a method that includes: determining, within a road network, a sequence of road links that satisfy a predetermined likelihood of being traversed by a vehicle, where the road network is segmented into tiles in a map data service provider database; receiving, in response to determining the sequence of road links, one or more tiles corresponding to the sequence of road links; searching within one or more tiles for objects within a predetermined distance of the sequence of road links; generating an object profile for each object, where the object profile includes information relating to the respective object and a distance of the respective object from the road link; and providing for at least semi-autonomous control of the vehicle based, at least in part, on the object profiles for objects associated with road links traversed by the vehicle. Searching within the one or more tiles may include searching for objects meeting at least one predefined criteria in addition to being within a predetermined distance of a road link of the sequence of road links.

Methods described herein may include determining, within a road network, a sequence of road links that satisfy a predetermined likelihood of being traversed by a vehicle; identifying objects that are within a predefined distance of each road link of the sequence of road links; generating an object profile for each object, where the object profile includes information relating to the respective object and a distance of the respective object from the road link; and generating driver assistance instructions based on the sequence of road links and the object profiles for each object within a predefined distance of each of the road links of the sequence of road links. Methods may include identifying road links within the road network that satisfy a predetermined likelihood of being traversed by the vehicle, where the road network is sub-divided into a plurality of map tiles; and providing for retrieval of each map tile from among the plurality of map tiles that include at least one identified road link.

According to some embodiments, identifying objects that are within a predefined distance of each of the sequence of road links may include searching within the retrieved tiles for objects; and identifying objects within the retrieved tiles, in response to the search, that correspond to at least one predefined object type and within the predefined distance of the sequence of road links. Identifying objects within the predefined distance of each of the sequence of road links may include: identifying a first road link from the sequence of road links; determining an object type; determining the predetermined distance based on the object type; searching for objects of the object type within the predefined distance of the first road link, where the predefined distance is a distance perpendicular to a polyline defined by the road link; and identifying objects of the object type within the predefined distance of the first road link.

According to some embodiments, the object profile for each object may include: a description of the object relative to the associated road link; an object type; an offset of the object from a defined point on a path including the associated road link; and a geometry of the object, where the geometry of the object includes at least a latitude and longitude position for at least one edge of the object. Identifying objects that are within a predefined distance of each of the sequence of road links may include cutting off an object at a predefined distance from the road link in response to the object extending beyond the predefined distance of the road link. Generating an object profile for each object may include identifying each object as one of static or dynamic, where static objects remain stationary relative to the road link, and dynamic objects move relative to the road link. The predefined distance may be determined for each road link, where the predefined distance of a respective road link may be dependent upon at least one of a number of lanes of the respective road segment or a functional class of the respective road segment. Embodiments of the methods described herein may include where driver assistance instructions include at least one of: location referencing, lane assistance, adaptive cruise control, or emergency braking.

Embodiments provided herein may provide an apparatus including: means for determining, within a road network, a sequence of road links that satisfy a predetermined likelihood of being traversed by a vehicle, where the road network is segmented into tiles in a map data service provider database; means for receiving, in response to determining the sequence of road links, one or more tiles corresponding to the sequence of road links; means for searching within one or more tiles for objects within a predetermined distance of the sequence of road links; means for generating an object profile for each object, where the object profile includes information relating to the respective object and a distance of the respective object from the road link; and providing for at least semi-autonomous control of the vehicle based, at least in part, on the object profiles for objects associated with road links traversed by the vehicle. The means for searching within the one or more tiles may include means for searching for objects meeting at least one predefined criteria in addition to being within a predetermined distance of a road link of the sequence of road links.

An apparatus as described herein may include means for determining, within a road network, a sequence of road links that satisfy a predetermined likelihood of being traversed by a vehicle; means for identifying objects that are within a predefined distance of each road link of the sequence of road links; means for generating an object profile for each object, where the object profile includes information relating to the respective object and a distance of the respective object from the road link; and means for generating driver assistance instructions based on the sequence of road links and the object profiles for each object within a predefined distance of each of the road links of the sequence of road links. An apparatus may include means for identifying road links within the road network that satisfy a predetermined likelihood of being traversed by the vehicle, where the road network is sub-divided into a plurality of map tiles; and means for providing for retrieval of each map tile from among the plurality of map tiles that include at least one identified road link.

According to some embodiments, means for identifying objects that are within a predefined distance of each of the sequence of road links may include means for searching within the retrieved tiles for objects; and identifying objects within the retrieved tiles, in response to the search, that correspond to at least one predefined object type and within the predefined distance of the sequence of road links. The means for identifying objects within the predefined distance of each of the sequence of road links may include: means for identifying a first road link from the sequence of road links; means for determining an object type; means for determining the predetermined distance based on the object type; means for searching for objects of the object type within the predefined distance of the first road link, where the predefined distance is a distance perpendicular to a polyline defined by the road link; and means for identifying objects of the object type within the predefined distance of the first road link.

According to some embodiments, the object profile for each object may include: a description of the object relative to the associated road link; an object type; an offset of the object from a defined point on a path including the associated road link; and a geometry of the object, where the geometry of the object includes at least a latitude and longitude position for at least one edge of the object. The means for identifying objects that are within a predefined distance of each of the sequence of road links may include means for cutting off an object at a predefined distance from the road link in response to the object extending beyond the predefined distance of the road link. The means for generating an object profile for each object may include identifying each object as one of static or dynamic, where static objects remain stationary relative to the road link, and dynamic objects move relative to the road link. The predefined distance may be determined for each road link, where the predefined distance of a respective road link may be dependent upon at least one of a number of lanes of the respective road segment or a functional class of the respective road segment. Embodiments of the apparatus described herein may include where driver assistance instructions include at least one of: location referencing, lane assistance, adaptive cruise control, or emergency braking.

BRIEF DESCRIPTION OF THE DRAWINGS

Figure 1:
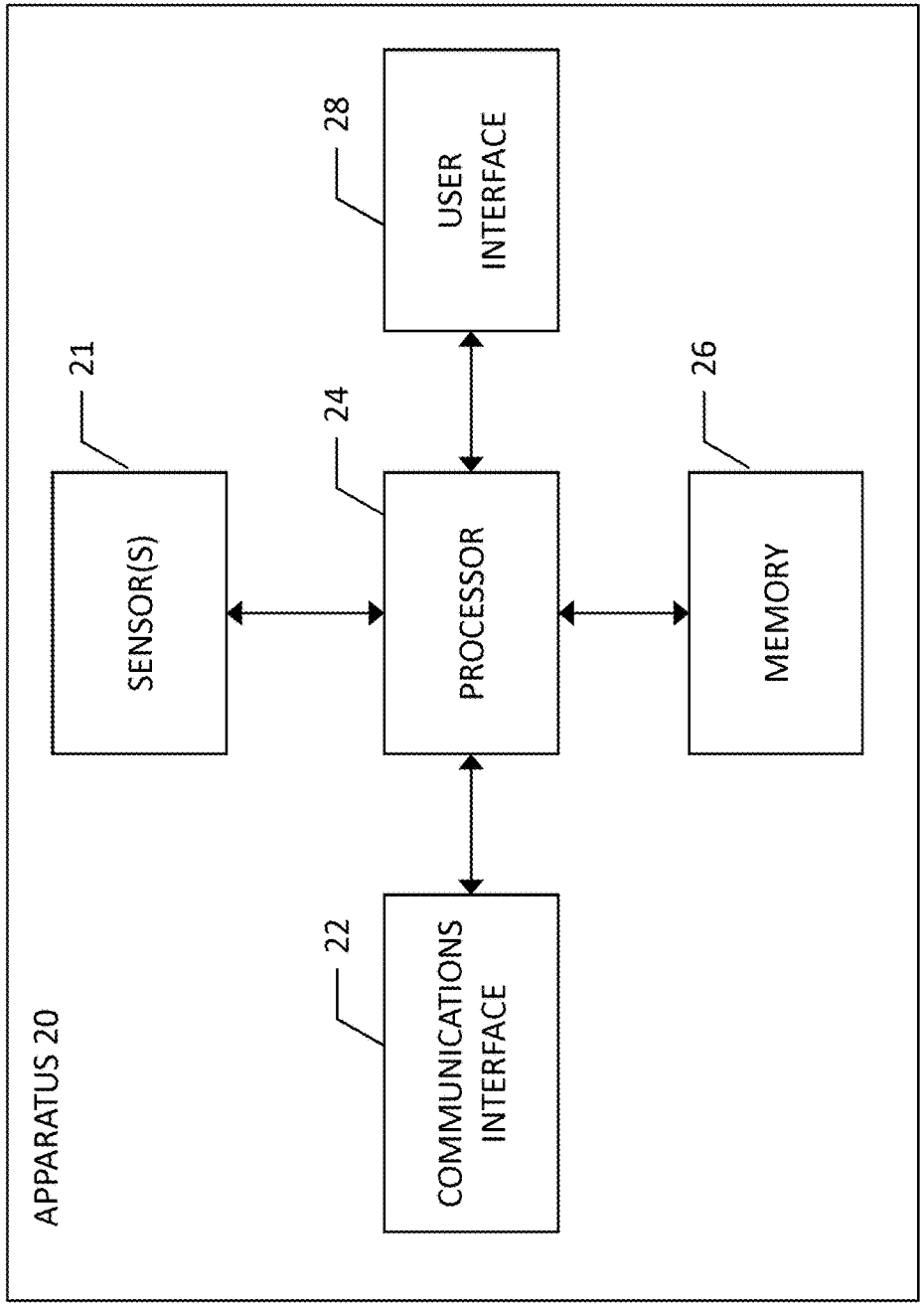
Figure 2:
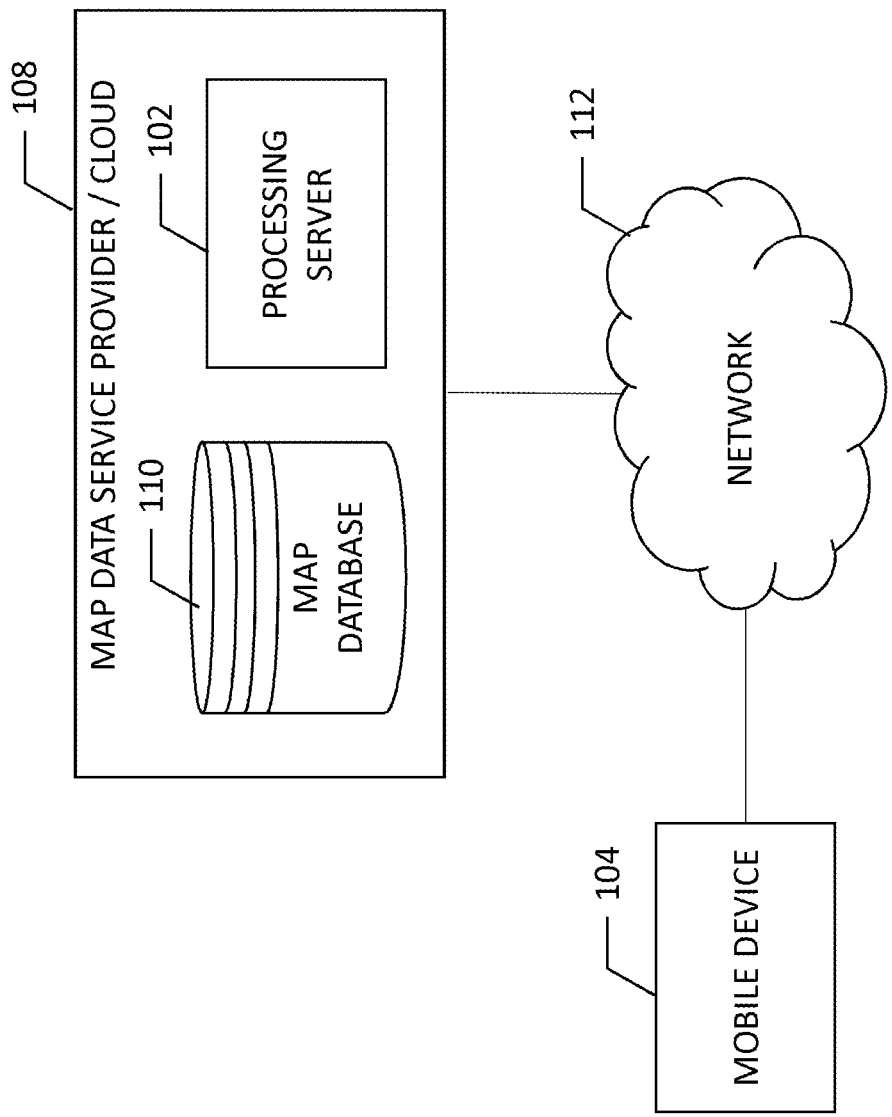
Figure 3:
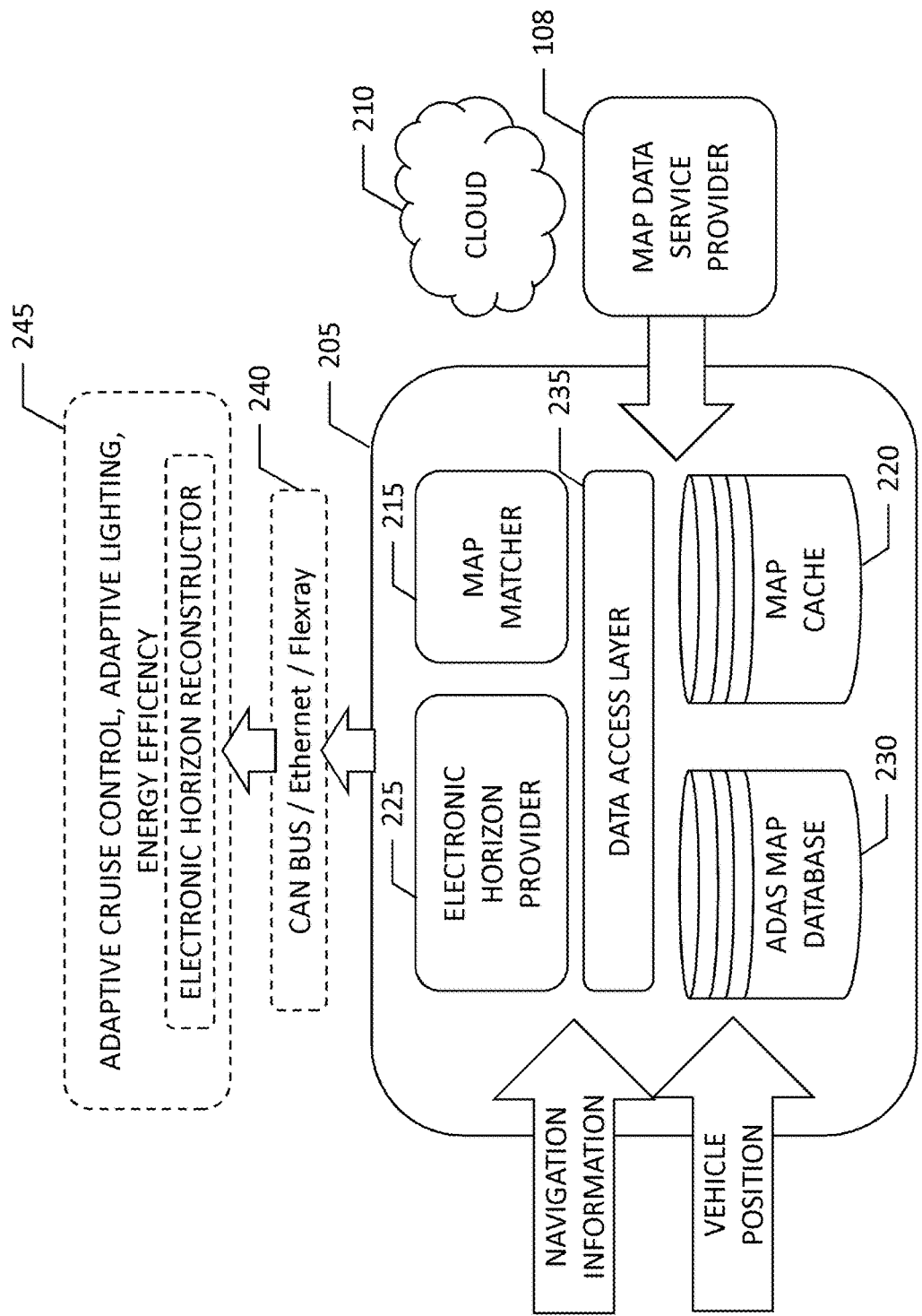
Figure 4:
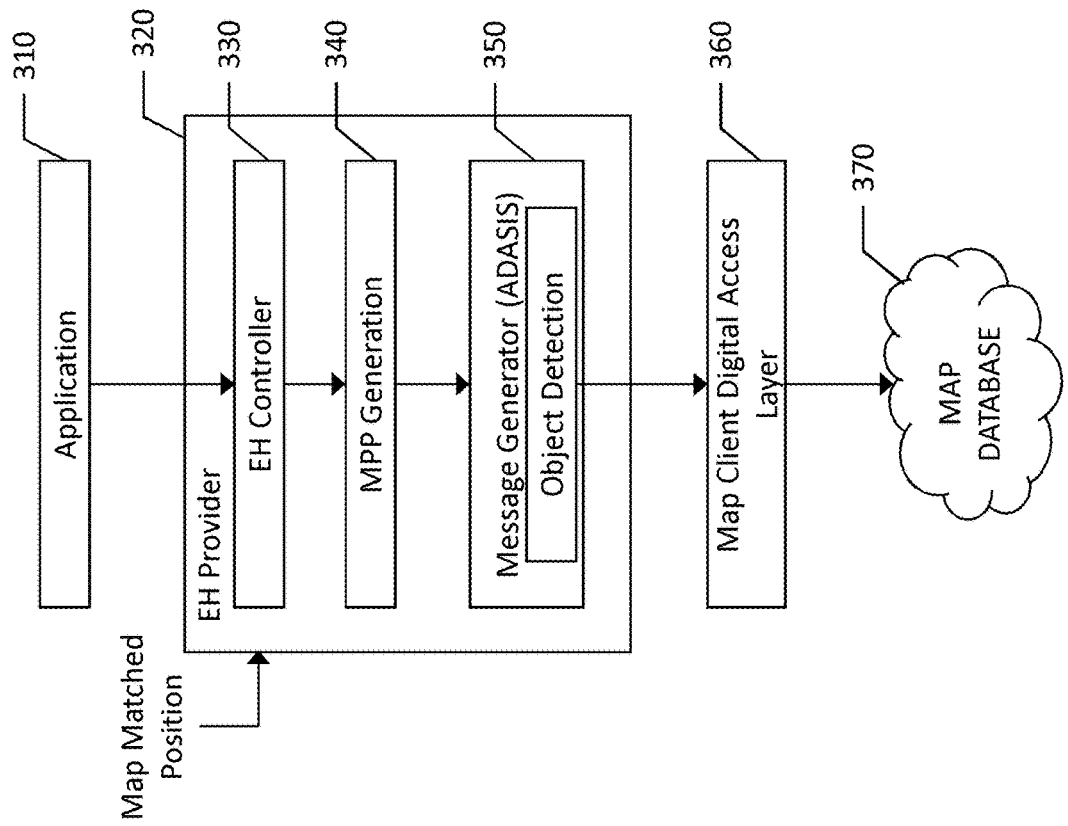
Figure 5:
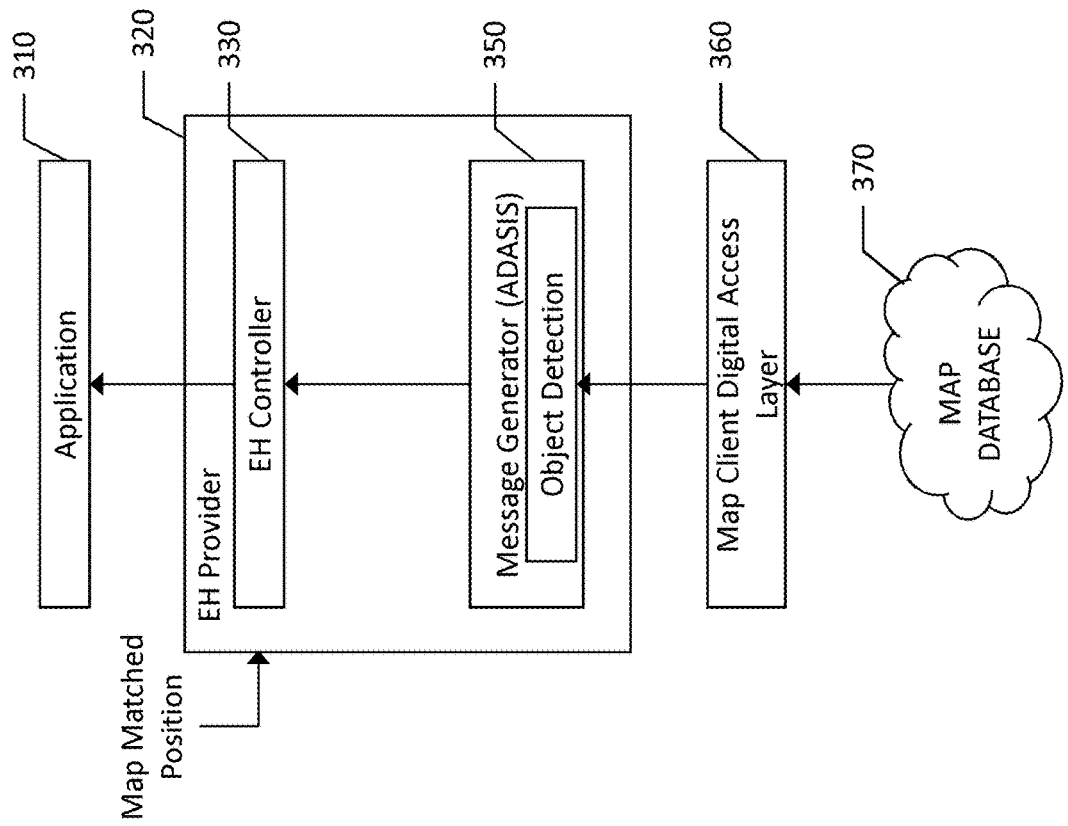
Figure 7:
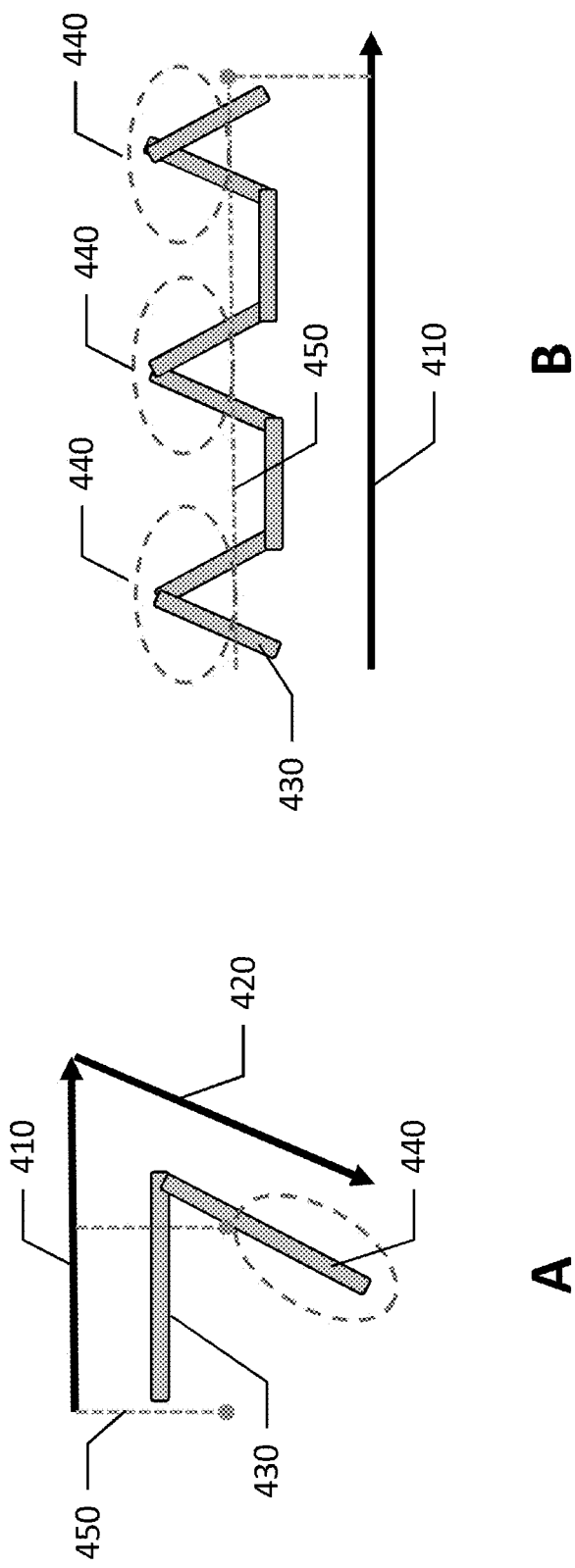
Figure 8:
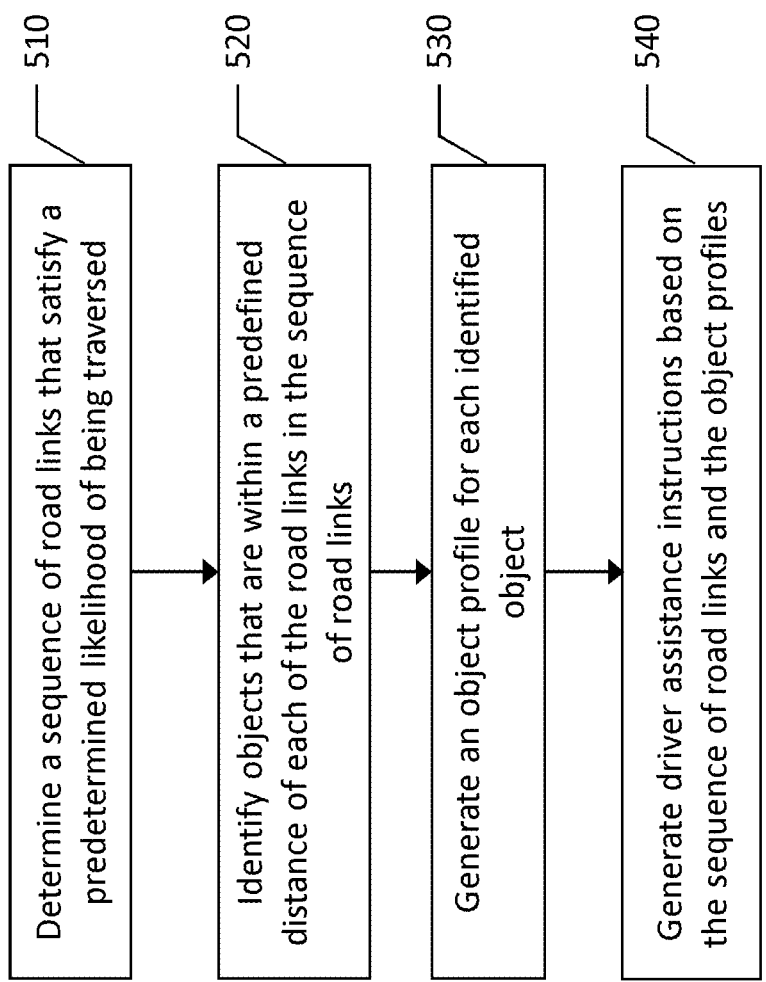

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system for identifying objects along a path of road links according to an example embodiment of the present invention;

FIG. 3 is another block diagram of a system for identifying objects along a path of road links according to an example embodiment of the present invention;

FIG. 4 is a flowchart of operations for establishing a most probable path and identifying objects along a most probable path according to an example embodiment of the present invention;

FIG. 5 is a flowchart of operations for providing object profiles to an apparatus to facilitate autonomous or semi-autonomous vehicle control according to an example embodiment of the present invention;

FIGS. 6A-6D illustrate four scenarios in which an identified object is split into portions included in an object profile and portions excluded from an object profile according to an example embodiment of the present invention;

FIGS. 7A-7B illustrate two additional scenarios in which an identified object is split into portions included in an object profile and portions excluded from an object profile according to an example embodiment of the present invention; and FIG. 8 is a flowchart of a method for identifying objects along a path of road links and generating object profiles thereof according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for providing associating objects along a plurality of road links with the road links, and generating object profiles for each of the objects to facilitate navigation and/or autonomous vehicle control along the road links. In this regard, objects located along a path or within a predefined distance of the road links of a path may be identified and correlated to the path through object profiles in ADASIS (Advanced Driver Assistance System Interface Specification). The object profiles describe the object in terms of object type, object location (e.g., the latitude and longitude and possibly altitude of one or more edges or vertices of the object), and the description of the object relative to a most probable path of the Electronic Horizon. While embodiments described herein reference a "most probable path", embodiments may include a probable path or a path satisfying a predetermined likelihood of being traversed by a vehicle, such that the "most" probable path is used as an example and is not intended to be limiting.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. However, in a preferred embodiment the apparatus 20 is embodied or partially embodied by a electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, LIDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Devices such as an ADAS may operate according to the ADASIS (Advance Driver Assistance System Interface Specification) protocol. In the ADASIS protocol, a road network may be represented as a directed graph. Road links currently travelled by a vehicle may be classified as the Most Probable Path (MPP) or Sub-Paths (SP), which may also be considered a sequence of links that satisfy a predetermined likelihood of being traversed by the vehicle. The sequence of road links that may be traversed by a vehicle (e.g., above a predetermined threshold of likelihood), may constitute an "Electronic Horizon" which may optionally be a graph of the road links. The ADASIS describes a road link or link based on the beginning of the link plus an offset distance, which is a distance along a path from an origin. Attributes may have separate profile types and may be connected to each other with the offset. Further, a link identifier profile gives the ID of the link to which a specific part of a path the road link belongs to.

To enhance the ADASIS protocol, embodiments described herein provide additional information about links and objects in the vicinity of the links for supporting applications including localization by object reference, lane keep assistance, lane change assistance, adaptive cruise control, emergency braking, or other features of autonomous vehicle control. However, while it is important to have detail about a path traveled by a vehicle, including objects along that path, it is also desirable to maintain a small footprint in terms of detail, memory consumption, and processing requirements. Keeping the level of detail of digital maps and routes to a minimum while maintaining all necessary detail ensures mission critical functions can be executed with minimal interruption or possibilities of failure.

Presently, digital maps may be segmented into tiles in a map database, such as map database 110 of map data service provider 108. Each tile contains a large number of map objects describing different geographical features, buildings, roads, vegetation, infrastructure, etc. Each one of these tiles may cover a relatively large area (e.g., 1 km (kilometer) by 1 km or 2 km by 2 km), where not all of the objects within a tile may be relevant to an Electronic Horizon probable path of a vehicle. Only a subset of objects within a tile may be relevant to the Electronic Horizon probable path of the vehicle. Embodiments described herein provide a method of identifying these objects and establishing how to identify and encode them in an ADASIS compatible message to reduce the amount of data from a map tile that needs to be processed to facilitate autonomous vehicle control or navigation assistance. ADAS applications are established as mission-critical functions and need only handle data relevant to the probable path of a vehicle such that extraneous data may be problematic or detrimental to the function of ADAS applications.

Segmenting the road network map into tiles may facilitate an improvement in the processing efficiency of an ADAS application as, instead of processing all road links or objects from an entire road network or within a predetermined radius of a vehicle, one or more tiles may individually be retrieved for processing based on a likelihood that the respective tile includes a road link that satisfies a predetermined likelihood of being traversed.

While paths comprising road links within ADASIS coexist with road side objects or barriers, there is no correlation between the road links and the road side objects or barriers. Provided herein is a method to perform a corridor search on a road link corresponding to a probable path (e.g., MPP or SP) of a vehicle. The search identifies objects on the tiles that are within a predefined distance of the mid-line of the road link. The predefined distance for the search can be fixed for all objects or specific to an object type. Further, the predefined distance can vary based on the number of lanes of a road link or the functional class of the road link (e.g., interstate roads, other freeways and expressways, principal arterials, minor arterials, etc., as defined by the US Federal Highway Administration).

Once objects within a predefined distance are identified, an ADASIS object profile for the object, or object profile, may be created. The object profile may include a description of the object relative to the probable path of a vehicle. The object may be described in terms of its type, distance from the centerline of the respective road link on which the object is found, an offset from the beginning of the road link (e.g., a distance along the link from the start of the link or the start of a path), and a geometry of the object. The object may optionally be classified as either static (e.g., stationary relative to the road link) or dynamic (e.g., may move relative to the road link). The geometry of objects that lie partially outside of the search corridor (e.g., extend from within the predetermined distance from the road link to beyond the predetermined distance from the road link) may be described in the object profile only to the point at which they reach the predetermined distance from the road link. Objects may be "cut" at this predetermined distance in order to minimize the amount of data used to describe such objects.

Once an ADASIS object profile or an object profile has been established for the probable path of a vehicle, the profile may be sent to an Electronic Horizon reconstructor to be used in an ADAS application at the vehicle. This approach may be extended from a most probable path to sub-paths of the Electronic Horizon which may be computed either in parallel or serially according to the sub-path's probability of being traversed by the vehicle.

FIG. 3 illustrates an example embodiment of architecture specifically configured for implementing embodiments described herein. The illustrated embodiment of FIG. 3 may be vehicle-based, where information regarding map data is provided via a map data service provider 108 and vehicle position along with navigation information is established based on data received at the vehicle. As illustrated, the architecture includes a map data service provider 108 that provides map data (e.g., in the form of map tiles) to the Electronic Horizon service 205, which may be vehicle-based or server based depending upon application. The map data service provider may be a cloud-based 210 service. The Electronic Horizon receives navigation information and vehicle position and uses that information to map-match 215 the position to a road link on a map tile of the mapped network of roads stored in the map cache 220. This link, along with the direction of travel, establishes the probable path of the vehicle or most probable path. Accordingly, sub-paths are determined to be the next road links that the vehicle can reach from the current location with probabilities of the vehicle traversing each link attached to the link. The Electronic Horizon provider 225 may search along the road links for the most probable path and sub-paths for objects within a predefined distance from the respective links. The objects found are reformatted into ADASIS compliant link profiles or object profiles and stored on the ADAS map database 230. The ADASIS compliant object profiles are sent via the CAN (computer area network) BUS (or Ethernet or Flexray) 240 to the electronic control unit (ECU) 245 of the vehicle to implement ADAS functionality, such as various forms of autonomous or assisted driving, or navigation assistance.

The Electronic Horizon provider, in searching along a road link on a map tile may operate according to the process described herein. The EH provider may select a link corresponding to the most probable path established by the EH. An object type may be established, and a predetermined distance from the road link may be determined. The predetermined distance may be based on the object type or the functional road class, for example. Objects within the predetermined distance of the road link may be established and extracted from the map. The objects may be filtered according to object type before extraction from the map, or after extraction from the map. The predetermined distance may be measured based on a distance perpendicular to a polyline of the link along which the object is found. Depending upon the application, the predetermined distance may be set to a value within an operational range of a sensor. Sensor ranges may be configured to be dependent upon a respective sensor's specifications. The search by the EH provider 225 may be performed on the latest available map tile which is obtained from the map data service provider 108.

Once the objects are selected, an ADASIS profile entry for the object is created. The profile may include a description of the object relative to the link on which it was found or the most probable path according to the Electronic Horizon. The object may be described within the profile in terms of the object type, an offset from the beginning of the link, and the object geometry. The perpendicular distance of the object with respect to the link may be calculated. While the calculation may be based on an object's two-dimensional (2D) footprint, a three-dimensional (3D) distance can be calculated. A height of the object may be considered, particularly with respect to a 3D distance to filter objects on a different level of a multi-level roadway from inclusion on the wrong path. For example, while the distance of an object from a roadway may be established based on the object's two-dimensional footprint, the object may be filtered (e.g., excluded) from being associated with a roadway based on an elevation of the roadway relative to the object. While the two-dimensional footprint may be used for determining distance from the roadway, the three-dimensional geometry of the object may be included in the object profile.'

FIGS. 4, 5, and 8 illustrate flowcharts depicting various methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a flowchart of a control flow for an implementation of embodiments described herein, whereby a most probable path request is sent to the EH controller 330 of the EH provider 320 from the application 310. The EH controller updates the position of the vehicle based on the map matched position received at the EH provider 320, and the most probable path (MPP) is generated at 340. A get message is sent to the message generator ADASIS 350, and an instruction to identify objects along the most probable path corridor including the predetermined distance from the links of the MPP is sent to the map client digital access layer 360, which obtains the map tiles from the map database 370, where object profiles corresponding to the filtered objects associated with the road segments.

FIG. 5 illustrates the data flow of the implementation of FIG. 4, whereby one or more map tiles relating to the most probable path and any associated sub-paths are returned from the map database 370 to the map client digital access layer 360. Objects relating to the most probable path corridor and their associated object profiles are provided to the ADASIS message generator 350. The ADASIS message generator 350 generates an ADASIS message with the most probable path and the object profiles along each link of the most probable path (and sub-paths) in the map tiles and sends the message to the EH controller 330, which forwards the ADASIS message to the application 310.

Figure 6:
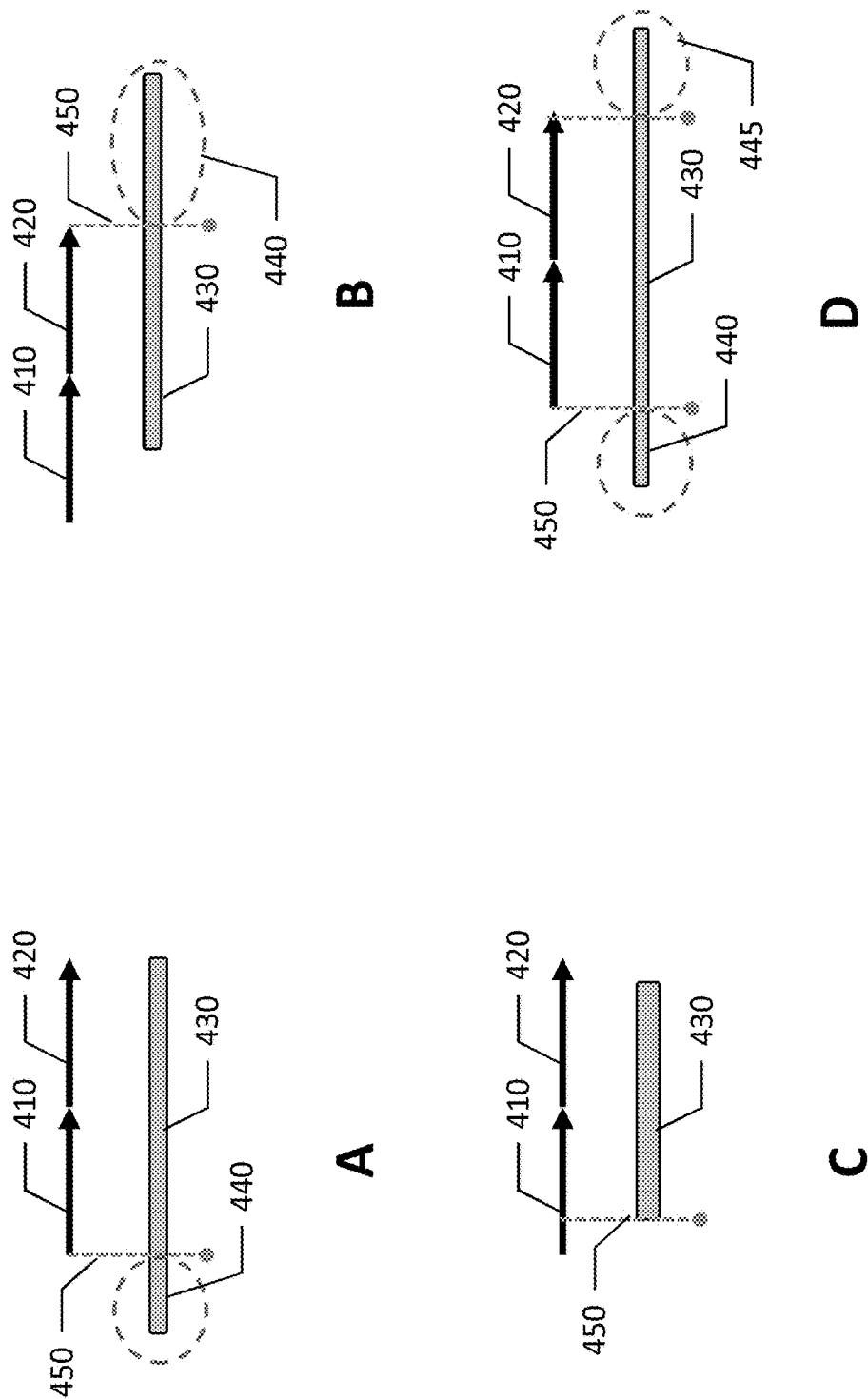

As described above, objects along a path that are identified are only identified within the predefined distance of an associated road link of the path (most probable or sub-). Some objects may have complex geometries, whereby an object may be split. FIG. 6 illustrates an example embodiment in which portions of an object are split or not part of the Electronic Horizon as they do not meet the criteria for identifying an object and associated profile along a path. In scenario A of FIG. 6, road links 410 and 420 are the most probable path, and 450 is the predetermined distance from the midline of the path. Barrier 430 includes a portion along the path that is included in an object profile for the links 410, 420, but portion 440 does not meet the criteria of being within a predefined distance perpendicular to the road links 410, 420 of the path as it is before the beginning of link 410. Thus, object 430 is split and portion 440 is excluded. Similarly, in scenario B of FIG. 6, portion 440 of the barrier 430 is beyond the end of the path represented by links 410 and 420, such that barrier 430 is split and portion 440 is excluded. In scenario C, no portion of the barrier 430 fails to meet the criteria for inclusion of the object, such that no portion of the barrier 430 is excluded. In scenario D, two portions 440, 445 of barrier 430 are split and excluded from inclusion in the object profile since these portions occur outside of the criteria for inclusion. Specifically, the path begins after the barrier begins with link 410, and ends at 420, before the barrier 430 ends.

FIG. 7 illustrates example embodiments of objects of complex shapes that require splitting and excluding portions thereof. As illustrated in scenario A of FIG. 7, a section 440 of barrier 430 may be excluded relative to a first link 410 of a path, but included as relevant to the second link 420 of the path. The object association in the object profile may therefore indicate that different portions of the same object may be associated with different links, while excluded from others. Scenario B of FIG. 7 illustrates an example embodiment of an object 430 that alternates within and outside of the predetermined distance 450 from the link 410. As shown, the object 430 is split with portions within the predetermined distance 450 from the link 410 included in an object profile, while portions 440 outside of the predetermined distance 450 are excluded from an object profile.

Objects identified along road links of paths in the Electronic Horizon may optionally be used for location referencing, particularly when other means for identifying a location of a vehicle (e.g. GPS) are unavailable or unreliable, such as in areas of dense trees or in an urban environment (e.g., an "urban canyon"). Optionally, location referencing may be used in addition to GPS to provide a more granular, accurate location. The mean error of GPS is typically about five meters under good conditions, while tolerances in map tiles described herein may be on the order of ten centimeters coupled to sensor tolerances of substantially less than one meter when observing objects within the range of the predetermined distance described herein. Thus, location referencing may supplement GPS or be used in place of GPS to provide reliable and accurate positioning of a vehicle along a road segment Objects identified along a road link by sensors on a vehicle (e.g., LIDAR, radar, ultrasound, computer vision etc.) may correlate the identified object with an object profile, where the object profile includes a defined location, such as with latitude, longitude, and potentially altitude. If a vehicle can identify an object within a reasonable degree of certainty, such as within a predefined likelihood, and the object has a defined object profile, the correlation between the identified object and the object profile may provide accurate positioning of the vehicle.

FIG. 8 illustrates a flowchart of a method for facilitating autonomous or semi-autonomous vehicle control through the identification of objects and the generation of object profiles. As shown, a sequence of road links that satisfies a predetermined likelihood of being traversed is determined at

510. This sequence of roads corresponds to the Electronic Horizon (EH) representation of the road network, essentially as a graph construct. The sequence of roads includes a most probable path and sub-paths that are established based on the position and heading of a vehicle, and may incorporate probable destinations, historical paths, or any other information that is supplied to the Electronic Horizon for consideration in establishing a likelihood that a vehicle will traverse a particular road segment. At 520, objects are identified that are within a predefined distance of each of the road links in the sequence of road links. For each object identified at 520, an object profile is generated at 530 where the object profile includes information relating to the respective object and a distance of the respective object from the road link. At 540, driver assistance instructions are generated based on the sequence of road links and the object profiles for each object within a predefined distance of each of the road links of the sequence of road links. The driver assistance instructions may include navigation assistance for a driver of a vehicle, or may be autonomous or semi-autonomous vehicle control instructions. Autonomous vehicle control instructions may be in the form of emergency braking conditions, lane change/lane keep assist, adaptive cruise control, location referencing, or a combination thereof. Autonomous vehicle control instructions may facilitate partial or complete autonomous control of the vehicle in guiding the vehicle along the path including the road links.

In an example embodiment, an apparatus for performing the method of FIG. 8 above may comprise a processor (e.g., the processor 24) configured to perform some or each of the operations (510-540) described above. The processor may, for example, be configured to perform the operations (510-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-540 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions, the computer program code instructions configured to, when executed, cause the apparatus to at least:

determine, within a road network, a sequence of road links that satisfy a predetermined likelihood of being traversed by a vehicle, wherein the road network is segmented into tiles in a map data service provider database;

receive, in response to determining the sequence of road links, one or more tiles corresponding to the sequence of road links;

search within the one or more tiles for objects within a predetermined distance of the sequence of road links;

generate an object profile for each object, wherein the object profile includes a geometry of a respective object and a distance of the respective object from the road link, wherein in response to the geometry of the respective object extending beyond the predetermined distance from an associated road link, cutting off the geometry of the object at the predetermined distance from the associated road link wherein cutting off the geometry comprises dividing the geometry into at least two portions and at least one of the at least two portions is excluded from the object profile; and provide for at least semi-autonomous control of the vehicle based, at least in part, on the object profiles for objects associated with road links traversed by the vehicle.

2. The apparatus of claim 1, wherein causing the apparatus to search within the one or more tiles comprises causing the apparatus to search for objects meeting at least one predefined criteria in addition to being within the predetermined distance of a road link of the sequence of road links.

3. An apparatus comprising at least one processor and at least one non-transitory memory including computer program code instructions, the computer program code instructions configured to, when executed, cause the apparatus to at least:

determine, within a road network, a sequence of road links that satisfy a predetermined likelihood of being traversed by a vehicle;

identify objects that are within a predefined distance of each road link of the sequence of road links;

generate an object profile for each object, wherein the object profile includes a geometry of a respective object and a distance of the respective object from the road link, wherein in response to the geometry of the respective object extending beyond the predetermined distance from an associated road link, cutting off the geometry of the object at the predetermined distance from the associated road link, wherein cutting off the geometry comprises dividing the geometry into at least two portions and at least one of the at least two portions is excluded from the object profile; and generate driver assistance instructions based on the sequence of road links and the object profiles for each object within a predefined distance of each of the road links of the sequence of road links.

4. The apparatus of claim 3, wherein causing the apparatus to determine, within the road network, the sequence of road links that satisfy a predetermined likelihood of being traversed by the vehicle comprises causing the apparatus to:

identify road links within the road network that satisfy the predetermined likelihood of being traversed by the vehicle, wherein the road network is sub-divided into a plurality of map tiles; and provide for retrieval of each map tile from among the plurality of map tiles that includes at least one identified road link.

5. The apparatus of claim 4, wherein causing the apparatus to identify objects that are within the predefined distance of each of the sequence of road links comprises causing the apparatus to:
search within the retrieved tiles for objects; and
identify objects within the retrieved tiles, in response to the search, that correspond to at least one predefined object type and within the predefined distance of each of the sequence of road links.

6. The apparatus of claim 3, wherein causing the apparatus to identify objects within the predefined distance of each of the sequence of road links comprises causing the apparatus to:
identify a first road link from the sequence of road links;
determine an object type;
determine the predefined distance based on the object type;
search for objects of the object type within the predefined distance of the first road link, wherein the predefined distance is a distance perpendicular to a polyline defined by the road link; and
identify objects of the object type within the predefined distance of the first road link.

7. The apparatus of claim 3, wherein the object profile for each object comprises:
a description of the object relative to the associated road link;
an object type;
an offset of the object from a defined point on a path including the associated road link; and
a geometry of the object, wherein the geometry of the object comprises at least a latitude and longitude position for at least one edge of the object.

8. The apparatus of claim 3, wherein causing the apparatus to generate an object profile for each object comprises causing the apparatus to identify each object as one of static or dynamic, wherein static objects remain stationary relative to the road link, and wherein dynamic objects move relative to the road link.

9. The apparatus of claim 3, wherein the predefined distance is determined for each road link, and wherein the predefined distance of a respective road link is dependent upon at least one of a number of lanes of the respective road segment or a functional class of the respective road segment.

10. The apparatus of claim 3, wherein the driver assistance instructions comprise at least one of: location referencing, lane assistance, adaptive cruise control, or emergency braking.

11. A computer program product comprising at least one non-transitory computer-readable storage medium having computer-executable program code instructions stored therein, the computer-executable program code instructions comprising program code instructions to:
determine, within a road network, a sequence of road links that satisfy a predetermined likelihood of being traversed by a vehicle;
identify objects that are within a predefined distance of each of the sequence of road links;
generate an object profile for each object, wherein the object profile includes a geometry of a respective object and a distance of the respective object from the road link, wherein in response to the geometry of the respective object extending beyond the predetermined distance from an associated road link, cutting off the geometry of the object at the predetermined distance from the associated road link, wherein cutting off the geometry comprises dividing the geometry into at least two portions and at least one of the at least two portions is excluded from the object profile; and
generate driver assistance instructions based on the sequence of road links and the object profiles for each object within a predefined distance of each of the sequence of road links.

12. The computer program product of claim 11, wherein the program code instructions to determine, within the road network, the sequence of road links that satisfy the predetermined likelihood of being traversed by the vehicle comprise program code instructions to:
identify road links within the road network that satisfy the predetermined likelihood of being traversed by the vehicle, wherein the road network is sub-divided into a plurality of map tiles; and
provide for retrieval of each map tile from among the plurality of map tiles that includes at least one identified road link.

13. The computer program product of claim 12, wherein the program code instructions to identify objects that are within the predefined distance of each of the sequence of road links comprise program code instructions to:
search within the retrieved tiles for objects; and
identify objects within the retrieved tiles, in response to the search, that correspond to at least one predefined object type and within the predefined distance of each of the sequence of road links.

14. The computer program product of claim 11, wherein the program code instructions to identify objects within the predefined distance of each of the sequence of road links comprise program code instructions to:
identify a first road link from the sequence of road links;
determine an object type;
determine the predefined distance based on the object type;
search for objects of the object type within the predefined distance of the first road link, wherein the predefined distance is a distance perpendicular to a polyline defined by the road link; and
identify objects of the object type within the predefined distance of the first road link.

15. The computer program product of claim 11, wherein the object profile for each object comprises:
a description of the object relative to the associated road link;
an object type;
an offset of the object from a defined point on a path including the associated road link; and
a geometry of the object, wherein the geometry of the object comprises at least a latitude and longitude position for at least one edge of the object.

16. The computer program product of claim 11, wherein the program code instructions to generate an object profile for each object comprise program code instructions to identify each object as one of static or dynamic, wherein static objects remain stationary relative to the road link, and wherein dynamic objects move relative to the road link.

17. The computer program product of claim 11, wherein the predefined distance is determined for each road link, and wherein the predefined distance of a respective road link is dependent upon at least one of a number of lanes of the respective road segment or a functional class of the respective road segment.

18. The computer program product of claim 11, wherein the driver assistance instructions comprise at least one of: location referencing, lane assistance, adaptive cruise control, or emergency braking.

* * * * *